(12) United States Patent
Lee (10) Patent No.: US 8,351,847 B2
(45) Date of Patent: Jan. 8, 2013

(54) POWER BALANCING IN A COOPERATIVE COMMUNICATION NETWORK

(75) Inventor: Ki-Dong Lee, San Diego, CA (US)

(73) Assignee: LG Electronics Inc., Seoul (KR)

( * ) Notice: Subject to any disclaimer, the term of this patent is extended or adjusted under 35 U.S.C. 154(b) by 1187 days.

(21) Appl. No.: 12/172,779

(22) Filed: Jul. 14, 2008

(65) Prior Publication Data

US 2009/0017752 A1    Jan. 15, 2009

Related U.S. Application Data

(60) Provisional application No. 60/949,821, filed on Jul. 13, 2007, provisional application No. 61/028,151, filed on Feb. 12, 2008.

(51) Int. Cl.
*H04B 7/14* (2006.01)
*H04W 52/24* (2009.01)
*H04W 52/46* (2009.01)

(52) U.S. Cl. .................. 455/10; 455/7; 455/522

(58) Field of Classification Search .................. None
See application file for complete search history.

(56) References Cited

U.S. PATENT DOCUMENTS

2004/0266339 A1* 12/2004 Larsson ................ 455/7

2005/0255808 A1   11/2005 Ahmed et al.
2009/0010215 A1*   1/2009 Kim et al. .............. 370/329

FOREIGN PATENT DOCUMENTS

| | | |
|---|---|---|
| JP | 2004304573 | 10/2004 |
| JP | 2007500482 | 1/2007 |
| JP | 2007043690 | 2/2007 |
| KR | 10-2006-0057471 | 5/2006 |
| WO | 2004/107693 | 12/2004 |
| WO | 2005094326 | 10/2005 |
| WO | 2006/030987 | 3/2006 |
| WO | 2006/030988 | 3/2006 |
| WO | 2007/064249 | 6/2007 |

* cited by examiner

*Primary Examiner* — Philip Sobutka (74) *Attorney, Agent, or Firm* — Lee, Hong, Degerman, Kang & Waimey (57) ABSTRACT

A method of adjusting transmission power for data communicated in a mobile communication system, wherein data is transmitted from a source station to a destination station over a first route and a second route. The method comprises receiving a first transmission power control signal; wherein a destination station generates a second transmission power control signal, in response to receiving a quality measurement signal from the relay station for data communicated to the destination station over a combination of the first route and the second route; and adjusting data transmission power according to the first transmission power control signal.

16 Claims, 8 Drawing Sheets

POWER BALANCING IN A COOPERATIVE COMMUNICATION NETWORK

CROSS-REFERENCED TO RELATED APPLICATIONS

This application claims the benefit of U.S. Provisional Application No. 60/949,821, filed on Jul. 13, 2007 and U.S. Provisional Application No. 61/028,151 filed on Feb. 12, 2008, the contents of which are hereby incorporated by reference in this application.

TECHNICAL FIELD

The present invention relates to a method of adjusting transmission power for data communicated in a mobile communication system.

BACKGROUND

Figure 1:
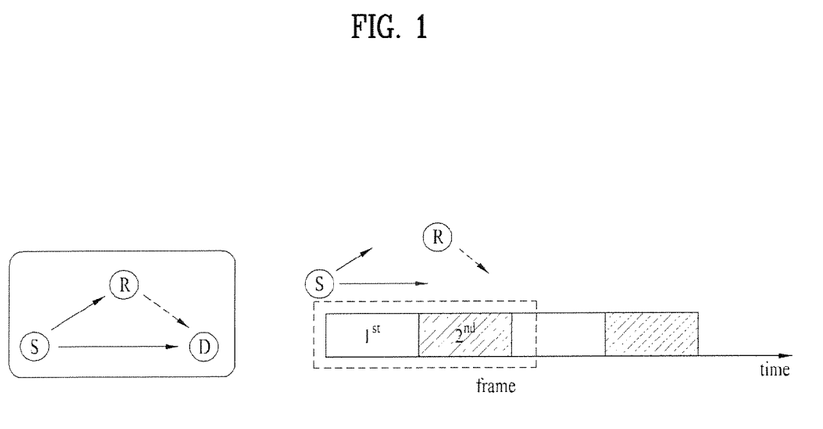
FIG. 1 is an exemplary system environment illustrating the topology of a cooperative mobile communication network, in accordance with one embodiment.

Referring to FIG. 1, certain mobile communications networks include relay nodes (R) that use cooperative relays to decode and forward data communicated from a source node (S) to a destination node (D). A mobile terminal (S) thus can be connected to the base station (D) directly or through a relay node (R). If a mobile terminal has no relays around it, the mobile terminal is connected to the base station directly. However, if a mobile terminal is in the proximity of a relay node and if using the relay node is better in terms of a certain metrics, such as energy consumption, etc. the terminal can be connected to the base station through the relay node.

In wireless networks, where mobile terminals communicate via relay nodes, signal to noise ratio (SNR) of those links in cooperative transmission frequently generate imbalance in transmit power. For example, suppose that there are one source node, one relay node, and one destination node. Given that the transmit power levels are unbalanced, one node consumes more power than it eventually contributes to the throughput that the destination node can achieve, whereas the other node causes a lower-limit in the throughput.

As shown in FIG. 1, in a decode and forward scenario, series of time frames are utilized, where each time frame has two time slots. In the first time slot, the source node transmits at power level P1, and the relay and destination nodes receive the signal from the source node. In the second time slot, the relay forwards the information received from the source node to the destination node and the destination node combines the two signals, one directly from the source node and the other relayed by the relay node, to take advantage of cooperation diversity among the nodes.

In a decode and forward implementation, the reception capacity that the destination node can achieve is upper bounded by the minimum of the following two factors: 1) the SNR of the signal from the source node at the relay node, and 2) the combined SNR of signals from the source node during the first time slot and from the relay node during the second time slot at the destination node. One problem associated with the above implementation is that the two noted factors may be different from each other causing a redundancy when there is deviation between these two factors. If the absolute value of the deviation is redundant then there is no overall positive contribution to the signal transmission.

In other words, in cooperative relay networks, the capacity that can be achieved at the destination node is upper-bounded by one of SNRs of the links involved in the cooperative relay. SNRs at the destination nodes (whether intermediate or final destinations) are dependent upon various factors, such as the transmit power at the source nodes. For the above reasons, even if the source transmits at a high level of power, the destination node may not benefit from such increase in transmission. In many cases, in fact, untamed increase in transmit power in a certain node may result in poor throughput, contributing to additional system interference.

Systems and methods are needed that can overcome the above-noted problems.

SUMMARY

For purposes of summarizing, certain aspects, advantages, and novel features of the invention have been described herein. It is to be understood that not all such advantages may be achieved in accordance with any one particular embodiment of the invention. Thus, the invention may be embodied or carried out in a manner that achieves or optimizes one advantage or group of advantages without achieving all advantages as may be taught or suggested herein.

In one embodiment, a method of adjusting transmission power for data communicated in a mobile communication system is provided. The data is transmitted from a source station to a destination station over a first route and a second route. The method comprises receiving a first transmission power control signal; wherein a destination station generates a second transmission power control signal, in response to receiving a quality measurement signal from the relay station for data communicated to the destination station over a combination of the first route and the second route; and adjusting data transmission power according to the first transmission power control signal.

The first transmission power control signal may be received directly from the destination station, or the first transmission power control signal may be received from a relay station, in response to the relay station receiving the second transmission power control signal from the destination station. In one embodiment, the first route is characterized by a direct communication route established between the source station and the destination station. The second route is characterized by a communication route established between the source station and the destination station by way of the relay station.

The quality measurement signal is generated by the relay station based on signal to noise ratio for the data communicated to the relay station from the source station. The quality measurement signal is generated in predetermined time intervals. The second transmission power control signal is generated by the destination station in predetermined intervals. The second transmission power control signal is generated by the destination station in response to receiving N quality measurement signals from the relay station.

In one embodiment, the method may further comprise transmitting data to the destination station over the first route in a first time interval; and transmitting the same data to the relay station over a first segment of the second route in the first time interval, wherein the relay station transmits the same data to the destination station over a second segment of the second route in a second time interval. The first and second time intervals are within a single communication frame for data communicated between the source station and the destination station.

In accordance with another embodiment, a method of adjusting transmission rate for data communicated in a mobile communication system is provided, wherein data is transmitted from a source station to a destination station over a first route and a second route. The method comprises receiving a first transmission rate control signal from a relay station for adjusting data transmission rate from a source station to a relay station; wherein a destination station measures first quality measurement signal for traffic between the source station and the destination station (SNR (S,D)) and second quality measurement signal for traffic between the relay station and the destination station (SNR (R,D)), in response to receiving a quality measurement signal from the relay station for traffic between the source station and the relay station (SNR (S,R)); and adjusting data transmission rate according to the first transmission rate control signal.

In accordance with another embodiment, a method of adjusting transmission power for data communicated in a mobile communication system, wherein data is transmitted from a source station to a destination station over a first route and a second route, comprises receiving a transmission power control signal from a relay station, wherein the destination station generates a quality measurement signal based on data communicated to the destination station over a combination of the first route and the second route, and adjusting data transmission power according to the first transmission power control signal.

The transmission power control signal is received from the relay station, in response to the relay station receiving the quality measurement signal from the destination station. The first route is characterized by a direct communication route established between the source station and the destination station. The second route is characterized by a communication route established between the source station and the destination station by way of the relay station. The quality measurement signal is generated by the destination station based on signal to noise ratio for the data communicated to the destination station from the source station. The quality measurement signal is generated by the destination station based on signal to noise ratio for the data communicated to the destination station from the relay station. The quality measurement signal is generated in predetermined time intervals.

The transmission power control signal is generated by the relay station in predetermined intervals. The transmission power control signal is generated by the relay station in response to receiving N quality measurement signals from the destination station. The method may further comprise transmitting data to the destination station over the first route in a first time interval; and transmitting the same data to the relay station over a first segment of the second route in the first time interval, wherein the relay station transmits the same data to the destination station over a second segment of the second route in a second time interval. The first and second time intervals are within a single communication frame for data communicated between the source station and the destination station.

In another embodiment, a method of adjusting transmission rate for data communicated in a mobile communication system, wherein data is transmitted from a source station to a destination station over a first route and a second route, comprises receiving a first transmission rate control signal from a relay station for adjusting data transmission rate from a source station to a relay station; wherein a relay station measures first quality measurement signal for traffic between the source station and the relay station (SNR (S,R)) and transmits the first quality measurement signal to the destination station, so that the destination station measures a second quality measurement signal for traffic between the source station and the destination station (SNR (S,D)) and a third quality measurement signal for traffic between the relay station and the destination station (SNR (R,D)) and transmit the second and third quality measurement signal to the relay station, so that the relay station generates the first transmission rate control signal, and adjusting data transmission rate according to the first transmission rate control signal.

In yet another embodiment, a method of adjusting transmission power for data communicated in a mobile communication system, wherein data is transmitted from a source station to a destination station over a first route and a second route is provided. The method comprises receiving a first quality measurement signal for data transmitted over the first route and a second segment of the second route, wherein said second segment comprises a communication route established between the destination station and the relay station; receiving a second quality measurement signal for data transmitted over a first segment of the second route, wherein said first segment comprises a communication route established between the source station and the relay station; and generating a transmission power control signal transmitted to the relay station, in response to receiving the first and second quality measurement signals.

In another embodiment, a method of adjusting transmission rate for data communicated in a mobile communication system, wherein data is transmitted from a source station to a destination station over a first route and a second route comprises receiving first and second quality measurement signals from a relay station and a destination station, respectively, for adjusting data transmission rate from a source station to the relay station; wherein the relay station measures the first quality measurement signal for traffic between the source station and the relay station (SNR (S,R)) and forwards first quality measurement signal to the source station and the destination station, wherein the destination station measures the second quality measurement signal including information about signal to noise ratio for traffic between the relay station and the destination station (SNR (R,D)) and for traffic between the source station and the destination station (SNR (S,D)), in response to receiving the first quality measurement signal from the relay station for traffic between the source station and the relay station (SNR (S,R)), computing a first transmission rate control signal for traffic between the source station and the relay station, and a second transmission rate control signal for traffic between the destination station and the relay station; transmitting the second transmission rate control signal to the relay station so that the relay station adjusts data transmission rate between the relay station and the destination station according to the second transmission rate control signal; and adjusting data transmission rate between the source station and the relay station, according to the first transmission rate control signal.

In another embodiment, a method for adjusting data transmission power for a source station in a mobile communication network comprises receiving a notification to reduce data transmission power for data transmitted from a source station to a destination station over a first route and a second route, wherein the notification is generated in response to detecting an increase in data transmission throughput over a first segment of the second route comprising a communication route established between the source station and the relay station.

In one embodiment, a method of adjusting data transmission power for a source station in a mobile communication network comprises receiving a notification to increase data transmission power for data transmitted from a source station to a destination station over a first route and a second route, wherein the notification is generated in response to detecting a decrease in data transmission throughput or an increase in traffic volume over a first segment of the second route comprising a communication route established between the source station and the relay station.

In one embodiment, a method of adjusting data transmission power for a source station in a mobile communication network comprises transmitting data to a relay station and a destination station, wherein the relay station transmits the data received from a source station communicating with the destination station over a first route and a second route; wherein the relay station increases data transmission power for data transmitted from the relay station to the destination station, in response to detecting a decrease in data transmission throughput or an increase in traffic volume for data received from the source station.

In one embodiment, a method of adjusting data transmission power for a source station in a mobile communication network, comprises transmitting data to a relay station and a destination station, wherein the relay station transmits the data received from a source station communicating with the destination station over a first route and a second route; wherein the relay station decreases data transmission power for data transmitted from the relay station to the destination station, in response to detecting an increase in data transmission throughput or a decrease in the traffic volume for data received from the source station.

In accordance with another embodiment, a system comprising one or more logic units is provided. The one or more logic units are configured to perform the functions and operations associated with the above-disclosed methods. In accordance with yet another embodiment, a computer program product comprising a computer useable medium having a computer readable program is provided. The computer readable program when executed on a computer causes the computer to perform the functions and operations associated with the above-disclosed methods.

One or more of the above-disclosed embodiments in addition to certain alternatives are provided in further detail below with reference to the attached figures. The invention is not, however, limited to any particular embodiment disclosed.

BRIEF DESCRIPTION OF THE DRAWINGS

Embodiments of the present invention are understood by referring to the figures in the attached drawings, as provided below.

Features, elements, and aspects of the invention that are referenced by the same numerals in different figures represent the same, equivalent, or similar features, elements, or aspects, in accordance with one or more embodiments.

DETAILED DESCRIPTION OF EXAMPLE EMBODIMENTS

In accordance with a non-limiting embodiment, transmission power between a source node (S), a rely node (R) and a destination node (D) may be adjusted so that the reception rate at D is uniform for a combination of data transmitted to D through S and R. That is, the transmission power at the various nodes is controlled so that the reception rate at D is substantially the same for the cumulative signals received from S and R for the same transmission. Control for adjusting the transmission power can be provided at either S, R or D.

In certain embodiments, there can be one or more intermediate nodes (relay nodes) acting as a rely nodes R between S and D. Unless otherwise disclosed herein, S, D and R and the communication nodes discussed herein are part of a cooperative communication network.

Figure 2:
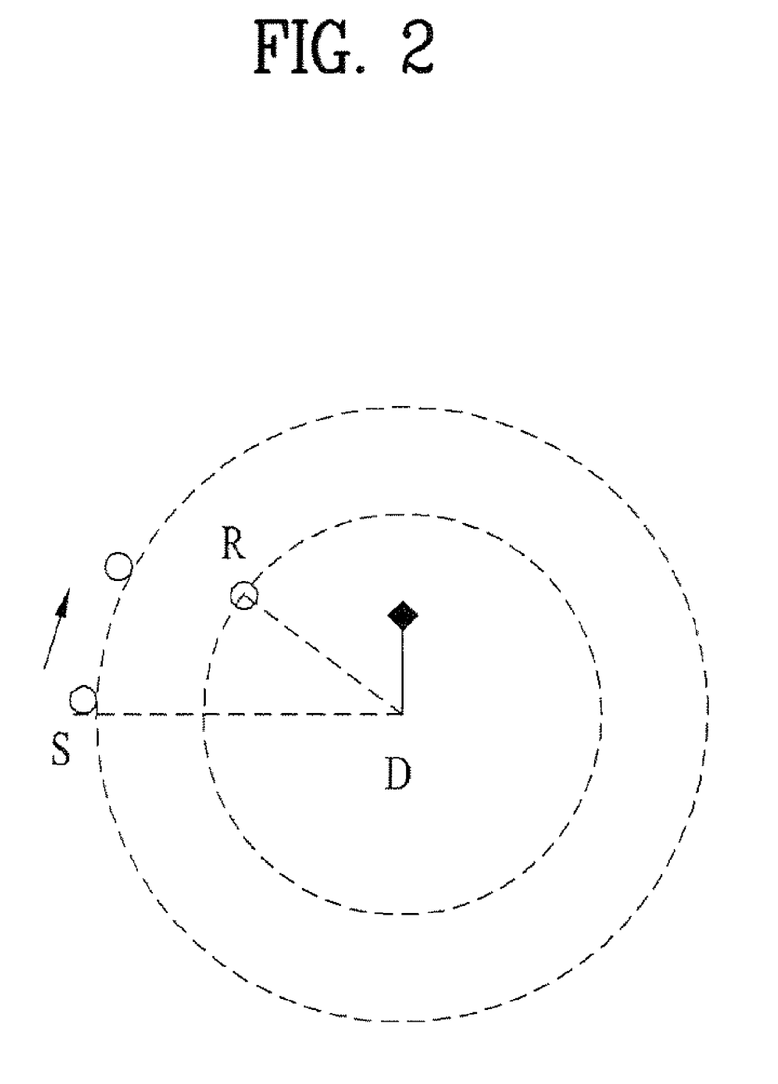
FIG. 2 illustrates an exemplary scenario in which a source node moves towards a relay node, while keeping a constant distance to a destination node, in accordance with one embodiment.

Referring to FIG. 2, for example, when S moves in relation to R, presume that distance between S and D remains the same, but S gets closer to R. In this case, data rate received at R increases, but data rate received by D remains the same. This results in waste in power, because the additional proximity of S to R does not translate into a better overall data transmission rate.

Figure 3:
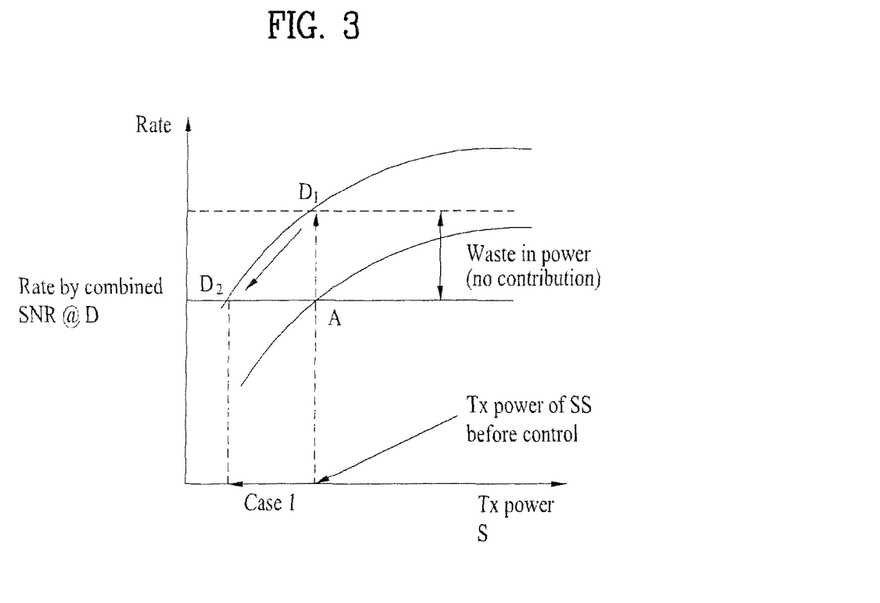
FIG. 3 is a graph of achievable rate change in a S-R link to reduce a waste in transmission power, in accordance with one embodiment.
Figure 4:
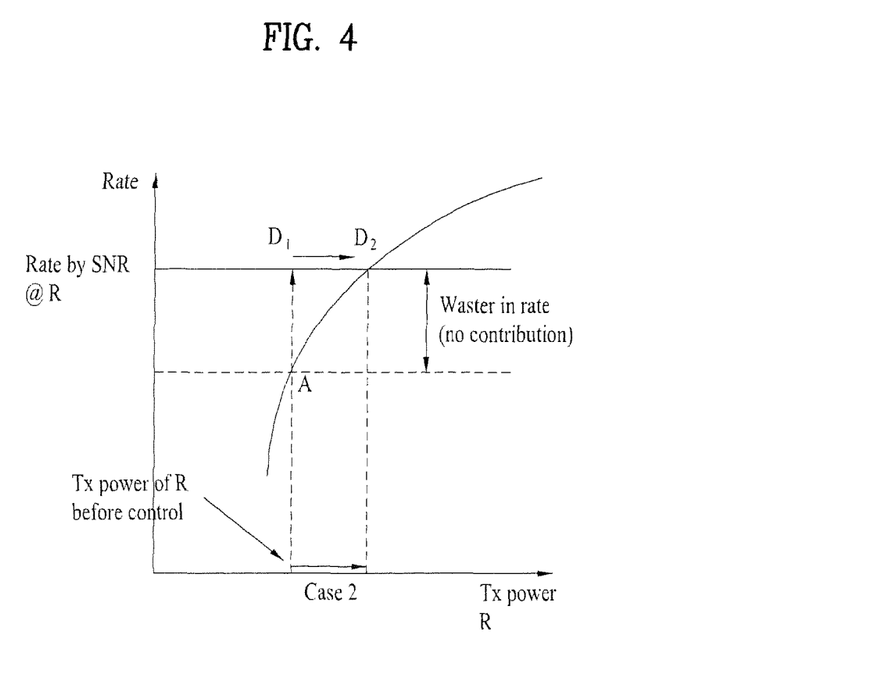
FIG. 4 is a graph of achievable rate change at a destination node by increasing transmission power, in accordance with one embodiment.

FIGS. 3 and 4 are graphical illustration of the change of the achievable rate in S-R link, where SNR at R in S-R link and the combined SNR at D are balanced at the beginning at point A. Given that S and R keep their transmit power levels constant, the achievable rate by the combined SNR at D remains the same, whereas the achievable rate in S-R link is increased because of the movement of S toward R. As shown, the lower curve moves upward towards the upper curve as S gets closer to R.

Because of the change in SNR, R has a higher achievable rate (i.e., $D_1 > A$) at the same transmit power level of S. The difference between point $D_1$ and point A with respect to rate does not contribute to the achievable rate at D because the combined SNR remains the same, causing itself to be the lower bound. As a result, there exists a non-zero gap between SNR (i.e., S-R @ R) and the combined SNR at D. As long as the gap is positive, one node, either S or R, consumes more power than necessary, not contributing to the achievable rate at D.

In one embodiment, the transmission power of S is reduced so that the data rate received at R is reduced to match that of D. The reduction in transmission power, also provides for power savings at D. In one embodiment, instead of saving battery power at S, the data throughput rate may be increased, by instructing R to increase its transmission power so that the cumulative data transfer rate from the S and R to D is increased. In this manner, the additional increase in data transmission rate at S and R does not go to waste.

Thus, one option is to reduce the transmit power of S. This option reduces waste in power consumption at S and may also reduce interference with other transmission sources. The other option is to increase the transmission power of R (i.e., to increase the lower bound). This option yields an increase in achievable rate at D. Accordingly, depending on the changes between the distance of the three entities S, D and R, different methods may be utilized to save power or increase the overall transmission rate.

Figure 5:
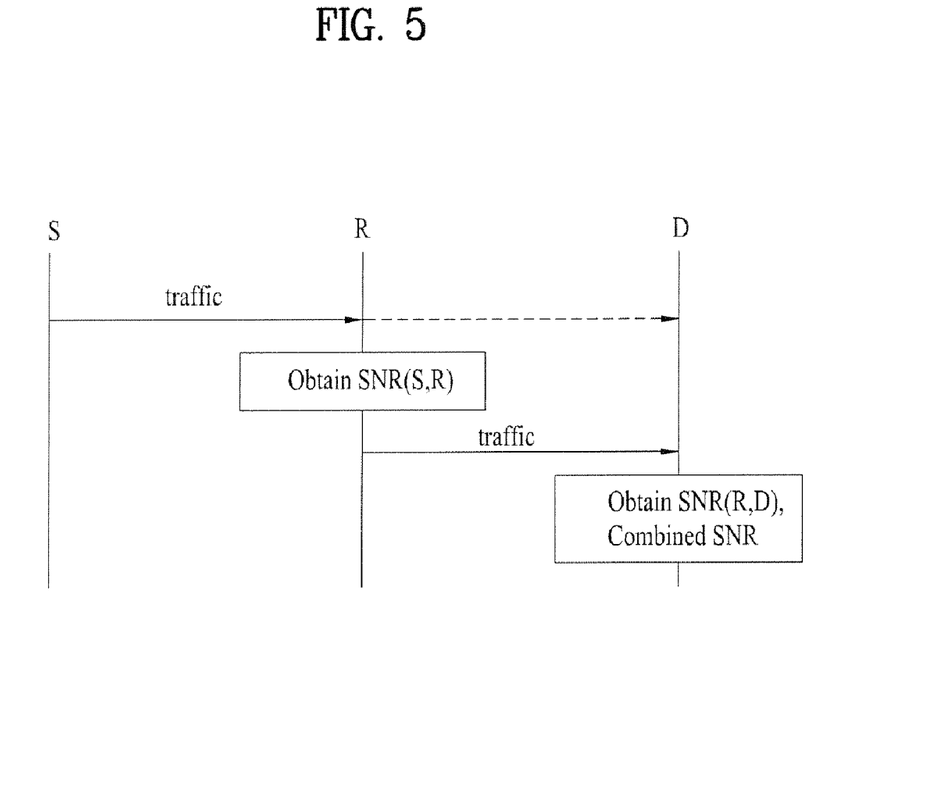
FIG. 5 is an illustration of traffic flow among source, relay and destination nodes to obtain and measure the SNR between said nodes, in accordance with one embodiment.

FIG. 5 illustrates the flows of traffic in a cooperative rely architecture in accordance with one embodiment. When R received data traffic from S, R can measure SNR in the S-R link, denoted by SNR(S-R). When D received the traffic from R, D can measure SNR of R-D link, denoted by SNR(R-D) and also measure the combined SNR. In accordance with one or more embodiments, either of the nodes S, R or D may control the transmission power at each node.

Figure 6:
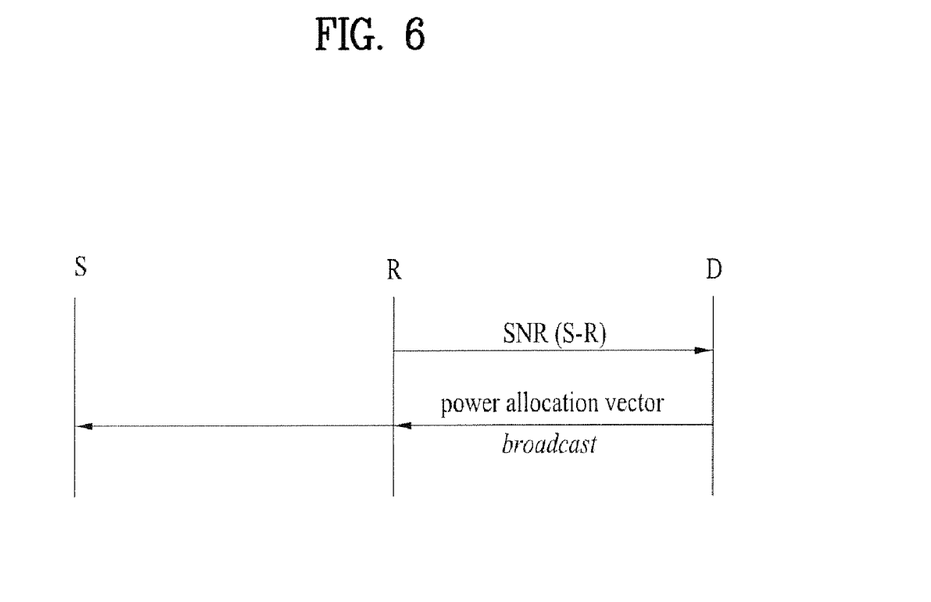
FIGS. 6 through 11 provide exemplary illustration of traffic flow among source, relay and destination nodes depending on the point of control at either of said nodes, in accordance with one or more embodiments.

In one embodiment, for example, D may control the power vector (e.g., the transmission power at different nodes). D may not be able to measure SNR(S-R) since R may not provide D with that information. Thus, in one embodiment, R informs D of SNR(S-R) so that D can control the power vector as provided in more detail below. (See FIG. 6—Case 1)

Figure 7:
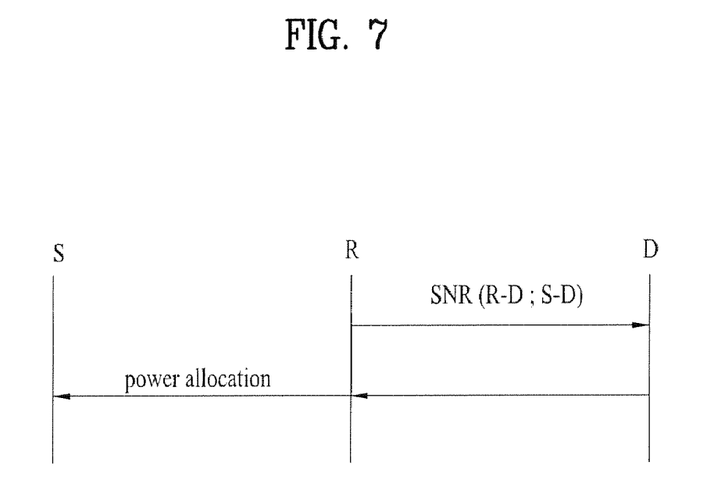

In another embodiment, for example, R may control the power vector. R may not be able to measure SNR(R-B) or combined SNR, since D may not provide R with that information. Thus, in accordance with one embodiment, D may inform R of SNR(R-B) and combined SNR so that R can control the power vector as provided in more detail below. (See FIG. 7—Case 2)

Figure 8:
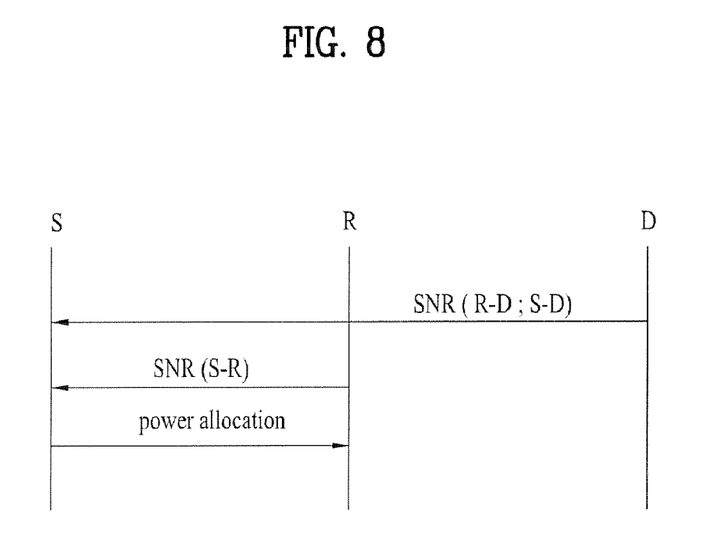

In yet another embodiment, S may control the power vector. S may not be able to measure SNR(S-R), SNR(R-B) and combined SNR because R and D may not provide S with that information. In one embodiment, R and D may provide S with SNR(S-R), SNR(R-B) and combined SNR so that S may control the power vector as provided in more detail below. (See FIG. 8—Case 3)

In the following tables, the costs associated with employing the above options is provided:

(1) Signaling Cost

|  | SNR Informing Cost (number of SNRs) | Power Vector Informing Cost (number of hops) |
| --- | --- | --- |
| Case 1 | 1 SNR | 2 hops |
| Case 2 | 2 SNR | 1 hop |
| Case 3 | 3 SNR | 1 hop |

(2) Computational Cost

|  | Computing Node(s) | Computational Cost per Node |
| --- | --- | --- |
| Case 1 | D | Low |
| Case 2 | R | Much lower (distributed) |
| Case 3 | S | Lowest (more distributed) |

(3) Extra Cost at S for Managing Power Control

|  | Extra Cost |
| --- | --- |
| Case 1 | None |
| Case 2 | None |
| Case 3 | Exist |

Figure 9:
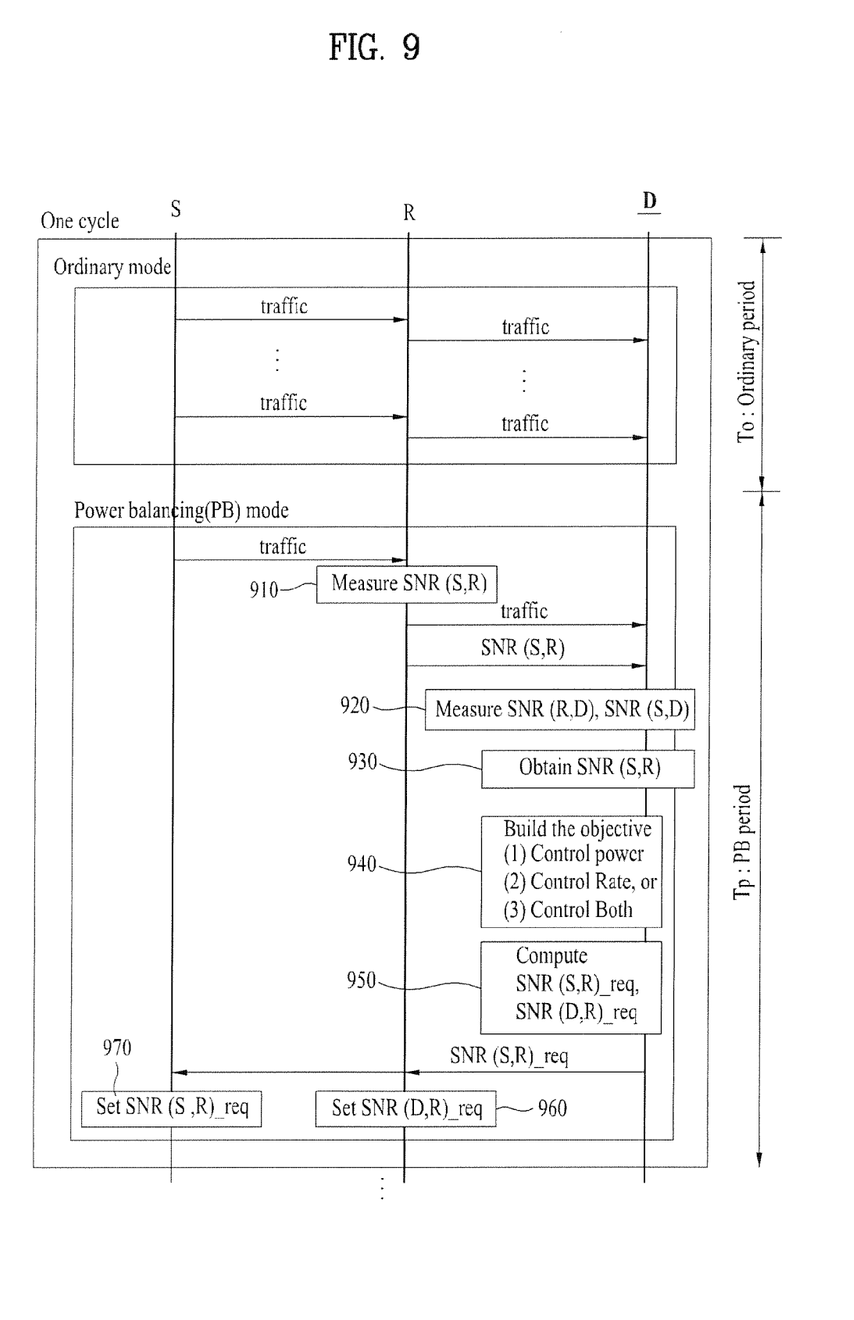
Figure 10:
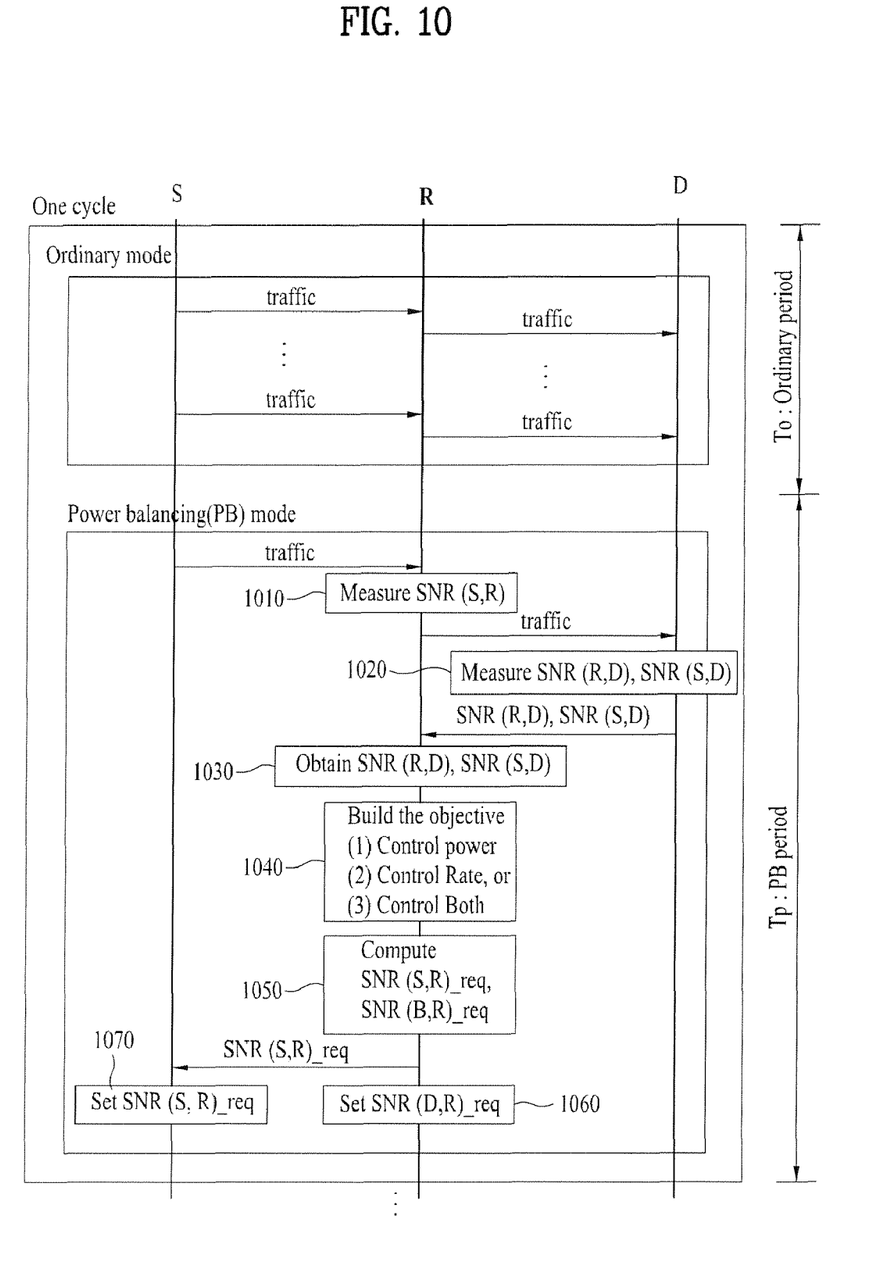
Figure 11:
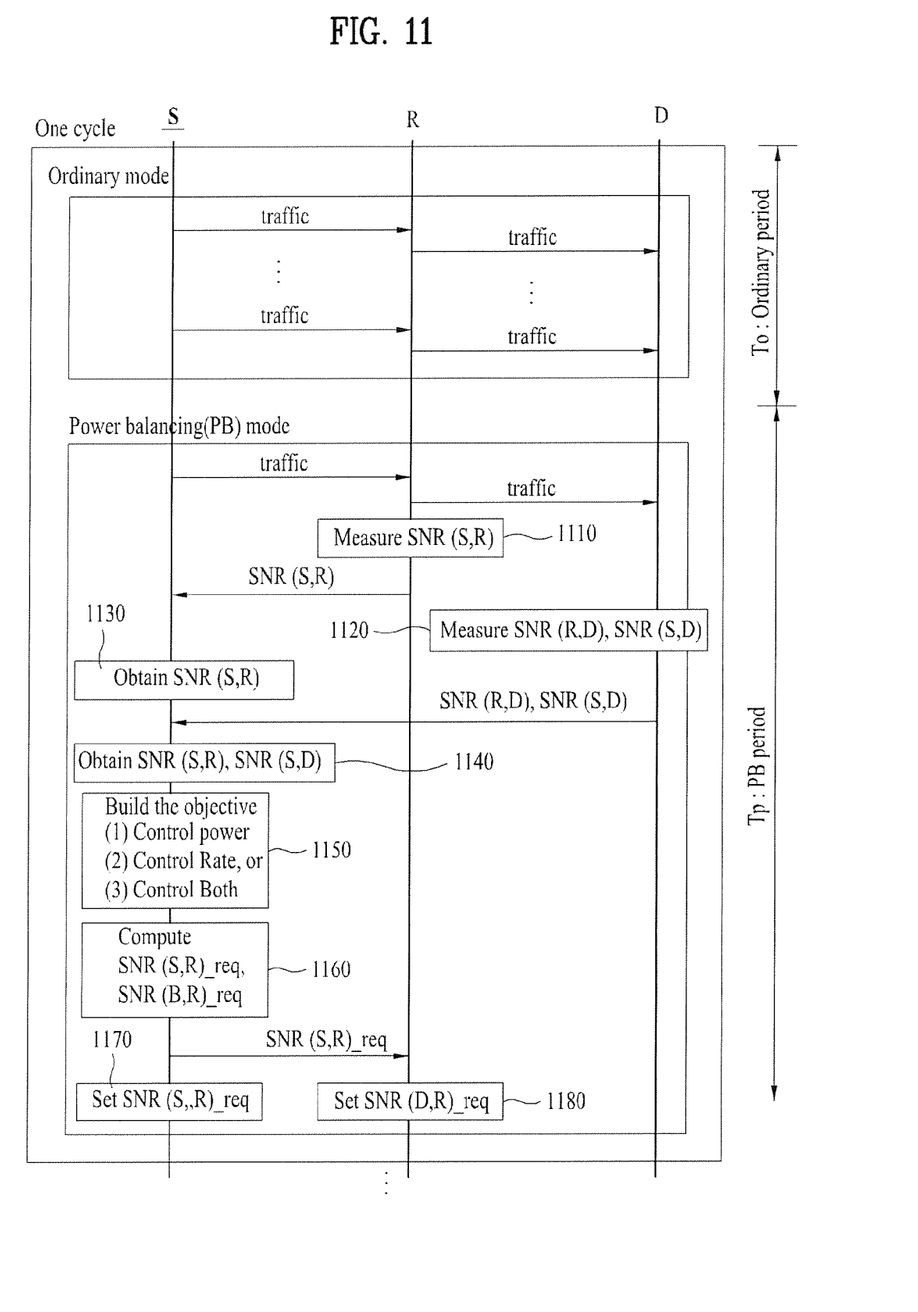

Referring to FIGS. 9 through 11, the power balancing methods according to one or more embodiments are disclosed for the above identified cases. As shown, an ordinary period (To) in which the ordinary mode is employed, and a power balancing period (Tp) in which the power balancing (PB) mode is activated are recognized.

Referring to FIG. 9, in case 1, D controls transmission power, transmission rate, or both. During Tp, R measures SNR (S-R), in response to receiving traffic data from S and provides that information to D (910). D measures SNR (R-D) and SNR (S-D) to obtain SNR (S-R) (920, 930). D, using the above information, may then determine whether to adjust (i.e., control) the transmission power, transmission rate or both at the other nodes S, R or both (940). In one embodiment, D may determine or compute the degree with which each of the transmission power or transmission rate between the nodes S, R and D are to be adjusted (950). Accordingly, the proper requests may be submitted by D to R and S respectively to adjust the corresponding transmission rate or power at each node (960, 970).

Referring to FIG. 10, in case 2, R controls transmission power, transmission rate, or both. During Tp, R measures SNR (S-R), in response to receiving traffic data from S and provides that information to D (1010). D measures SNR (R-D) and SNR (S-D) and forwards that information to R (1020). Based on the information provided by D, R obtains SNR (R-D) and SNR (S-D) (1030). R, using the above information, may then determine whether to adjust (i.e., control) the transmission power, transmission rate or both at the other nodes S, R or both (1040). In one embodiment, R may determine or compute the degree with which each of the transmission power or transmission rate between the nodes S, R and D are to be adjusted (1050). Accordingly, R may adjust the transmission power or rate at R (1060) or submit the proper request to S to adjust the corresponding transmission rate or power at S (1070).

Referring to FIG. 11, in case 3, S controls transmission power, transmission rate, or both. During Tp, R measures SNR (S-R), in response to receiving traffic data from S and provides that information to D (1110). D measures SNR (R-D) and SNR (S-D) (1120) and forwards that information to S. In one embodiment, R provides SNR (S-R) to both D and S. S, using the above information received from R or D, obtains SNR (S-R), SNR (R-D) and SNR (S-D) (1130, 1140) and uses said data to determine whether to adjust (i.e., control) the transmission power, transmission rate or both at the other nodes R, D or both (1150). In one embodiment, D may determine or compute the degree with which each of the transmission power or transmission rate between the nodes S, R and D are to be adjusted (1160). Accordingly, S may adjust the transmission power or rate at S (1170) or submit the proper request to R to adjust the corresponding transmission rate or power at R (1180).

In accordance to certain embodiments, depending on the ratio of To to Tp, different power balancing schemes may be implemented. For example, if To/Tp is approximately zero, the power balancing mode may be activated for every transmission (e.g., every time traffic data is transmitted from S to D). If To/Tp is approximately equal to one, then the power balancing mode may be activated for every first transmission within a series of transmissions. If To/Tp is equal to n, for example, the power balancing mode may be activated every (n−1) transmission. And, if To/Tp is greater than a certain threshold, then power balancing may not be activated at all.

Exemplary message formats for controlling or adjusting transmission power or rate (e.g., the SNR message formats and the power vector message formats) are provided below:

Message Format to Inform SNR (D Controls)

| Field | Size | Description |
| --- | --- | --- |
| SNR | N bits | Used to Describe SNR(S, R) |

Message Format to Inform SNR (R Controls)

| Field | Size | Description |
|---|---|---|
| SNR | N bits | Used to describe SNR(R, D) |
|  | M bits | Used to describe SNR(S, D) |

Message Format to Inform SNR (S Controls)

| Field | Size | Description |
|---|---|---|
| SNR | N bits | Used to describe SNR(R, D) |
|  | M bits | Used to describe SNR(S, D) |
|  | L bits | Used to describe SNR(S, R) |

Message Format for Power Vector (S/R/D Controls)

| Field | Size | Description |
|---|---|---|
| Up_Down | N bits | 000: do nothing |
|  |  | 001: power up |
|  |  | 010: power down |
|  |  | 011: power up (2+ step jump up) |
|  |  | 100: power down (2+ step down) |
|  |  | (other reserved fields) |

As shown, in the above exemplary SNR message formats, a plurality of fields may be implemented to define the a value (e.g., SNR) by which the transmission rate is to be adjusted, and the size of the message (e.g., the N bits), wherein N bits may represent up to $2^N$ discrete levels to define SNR values between the nodes S, R and D. A source ID and a destination ID may not be needed, in one or more embodiments, if said ID information are provided over a pre-assigned control channel.

As shown, in the above exemplary power vector message formats, a plurality of fields may be implemented to define whether the transmission power is to be increased or decreased (e.g., Up_Down), the size of the message (e.g., N bits) and further details about the degree with which to adjust the transmission power. For example, one of the fields may provide information about adjusting the transmission power at a single level or more than a single level (e.g., single step adjustment or multistep adjustment). Further, in an embodiment where S controls the power adjustment, if R is fixed in a location, it may not be needed to include multi step power up or power down fields in the message.

Depending on implementation, it is possible that the present invention can take the form of an entirely hardware embodiment, an entirely software embodiment or an embodiment containing both hardware and software elements. A software embodiment may include, but not be limited to, to firmware, resident software, microcode, etc.

Furthermore, the invention can take the form of a computer program product accessible from a computer-usable or computer-readable medium providing program code for use by or in connection with a computer or any instruction execution system. For the purposes of this description, a computer-usable or computer readable medium can be any apparatus that can contain, store, communicate, propagate, or transport the program for use by or in connection with the instruction execution system, apparatus, or device.

A data processing system suitable for storing and/or executing program code will include at least one processor coupled directly or indirectly to memory elements through a system bus. The memory elements can include local memory employed during actual execution of the program code, bulk storage, and cache memories which provide temporary storage of at least some program code in order to reduce the number of times code must be retrieved from bulk storage during execution.

Other components may be coupled to the system. Input/output or I/O devices (including but not limited to keyboards, displays, pointing devices, etc.) can be coupled to the system either directly or through intervening I/O controllers. Network adapters (e.g., modem, cable modem, Ethernet cards) may also be coupled to the system to enable the data processing system to become coupled to other data processing systems or remote printers or storage devices through intervening private or public networks.

It should be understood that the logic code, programs, modules, processes, methods, and the order in which the respective elements of each method are performed are purely exemplary. Depending on the implementation, they may be performed in any order or in parallel, unless indicated otherwise in the present disclosure. Further, the logic code is not related, or limited to any particular programming language, and may be comprise one or more modules that execute on one or more processors in a distributed, non-distributed, or multiprocessing environment.

The method as described above may be used in the fabrication of integrated circuit chips. The resulting integrated circuit chips can be distributed by the fabricator in raw wafer form (that is, as a single wafer that has multiple unpackaged chips), as a bare die, or in a packaged form. In the latter case, the chip is mounted in a single chip package (such as a plastic carrier, with leads that are affixed to a motherboard or other higher level carrier) or in a multi-chip package (such as a ceramic carrier that has either or both surface interconnections of buried interconnections).

In any case, the chip is then integrated with other chips, discrete circuit elements, and/or other signal processing devices as part of either (a) an intermediate product, such as a motherboard, or (b) and end product. The end product can be any product that includes integrated circuit chips, ranging from toys and other low-end applications to advanced computer products having a display, a keyboard or other input device, and a central processor.

Therefore, it should be understood that the invention can be practiced with modification and alteration within the spirit and scope of the appended claims. The description is not intended to be exhaustive or to limit the invention to the precise form disclosed. These and various other adaptations and combinations of the embodiments disclosed are within the scope of the invention and are further defined by the claims and their full scope of equivalents.

What is claimed is:

1. A method of adjusting at least transmission power or a transmission rate at a relay station for data communicated in a mobile communication system, wherein data is transmitted from a source station to a destination station over a first route and a second route, the method comprising:
measuring a Signal to Noise Ratio (SNR) between the source station and relay station (SNR(S-R));
receiving, from the destination station, an SNR between the source station and the destination station (SNR(S-D)) and an SNR between the relay station and destination station (SNR(R-D));
generating an adjustment value of the at least the transmission power or the transmission rate by using the SNR(S-R), the SNR(S-D) and the SNR(R-D); and transmitting the adjustment value to the source station for adjusting the at least the transmission power or the transmission rate.

2. The method of claim 1, wherein the first route is characterized by a direct communication route established between the source station and the destination station.

3. The method of claim 1, wherein the second route is characterized by a communication route established between the source station and the destination station by way of the relay station.

4. The method of claim 1, wherein:
data is transmitted from the source station to the destination station over the first route in a first time interval;
the same data is transmitted from the source station to the relay station over a first segment of the second route in the first time interval; and
the relay station transmits the same data to the destination station over a second segment of the second route in a second time interval.

5. The method of claim 1, wherein the first time interval the second time interval are within a single communication frame for data communicated between the source station and the destination station.

6. The method of claim 1, wherein:
a distance between the source station and the destination station remains the same; and
a distance between the source station and the relay station is decreasing.

7. A method of adjusting data transmission power for a source station in a mobile communication network, the method comprising:
receiving a notification to reduce data transmission power for data transmitted from the source station to a destination station over a first route and a second route,
wherein the notification is in response to detecting an increase in data transmission throughput over a first segment of the second route comprising a communication route established between the source station and a relay station.

8. The method of claim 7, wherein:
the first route comprises a first communication route directly established between the source station and the destination station; and
the second route comprises a second communication route established between the source station and the destination station by way of the relay station.

9. The method of claim 7, wherein the notification is generated by the relay station, in response to monitoring quality of transmission over the first segment of the second route.

10. A method of adjusting data transmission power for a source station in a mobile communication network, the method comprising:
receiving a notification to increase data transmission power for data transmitted from the source station to a destination station over a first route and a second route,
wherein the notification is in response to detecting a decrease in data transmission throughput or an increase in traffic volume over a first segment of the second route comprising a communication route established between the source station and a relay station.

11. The method of claim 10, wherein:
the first route comprises a first communication route directly established between the source station and the destination station; and
the second route comprises a second communication route established between the source station and the destination station by way of the relay station.

12. A method of adjusting data transmission power for a source station in a mobile communication network, the method comprising:
transmitting data to a relay station and a destination station, wherein the relay station transmits the data received from the source station communicating with the destination station over a first route and a second route;
wherein the relay station increases data transmission power for data transmitted from the relay station to the destination station, in response to detecting a decrease in data transmission throughput or an increase in traffic volume for data received from the source station.

13. The method of claim 12, wherein:
the first route comprises a first communication route directly established between the source station and the destination station; and
the second route comprises a second communication route established between the source station and the destination station by way of the relay station.

14. A method of adjusting data transmission power for a source station in a mobile communication network, the method comprising:
transmitting data to a relay station and a destination station, wherein the relay station transmits the data received from the source station communicating with the destination station over a first route and a second route;
wherein the relay station decreases data transmission power for data transmitted from the relay station to the destination station, in response to detecting an increase in data transmission throughput or a decrease in the traffic volume for data received from the source station.

15. The method of claim 14, wherein:
the first route comprises a first communication route directly established between the source station and the destination station; and
the second route comprises a second communication route established between the source station and the destination station by way of the relay station.

16. A method for adjusting at least a transmission power or a transmission rate at a source station for data communicated in a mobile communication system, wherein data is transmitted from the source station to a destination station over a first route and a second route, the method comprising:
receiving, from a relay station, an adjustment value of the at least the transmission power or the transmission rate; and
adjusting the at least the transmission power or the transmission rate by using the adjustment value,
wherein the adjustment value is based on a Signal to Noise Ratio (SNR) between the source station and the destination station (SNR(S-D)), an SNR between the relay station and the destination station (SNR(R-D)) and an SNR between the source station and the relay station (SNR (S-R)).

* * * * *